Nov. 24, 1964     J. E. HARRIS     3,158,141
REGULATING VALVE SYSTEM
Filed April 9, 1962
FIG. 1
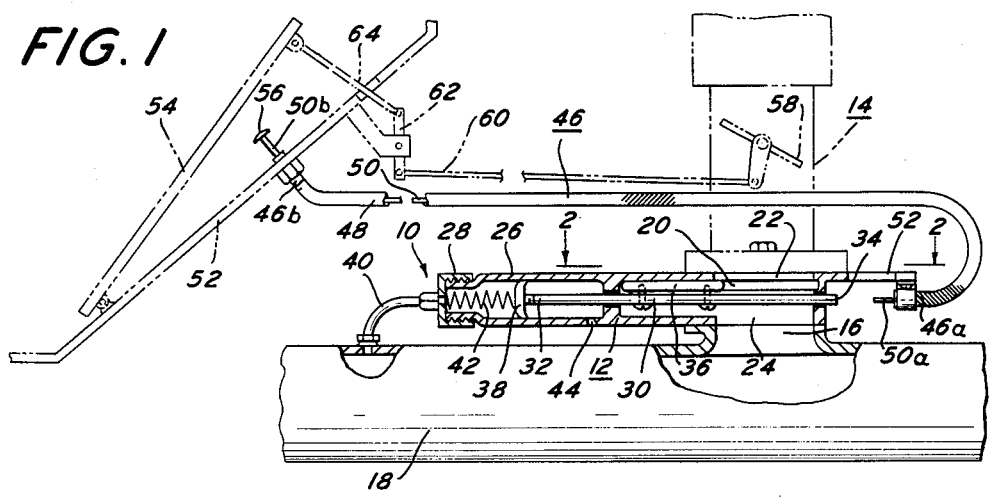
FIG. 2
FIG. 3
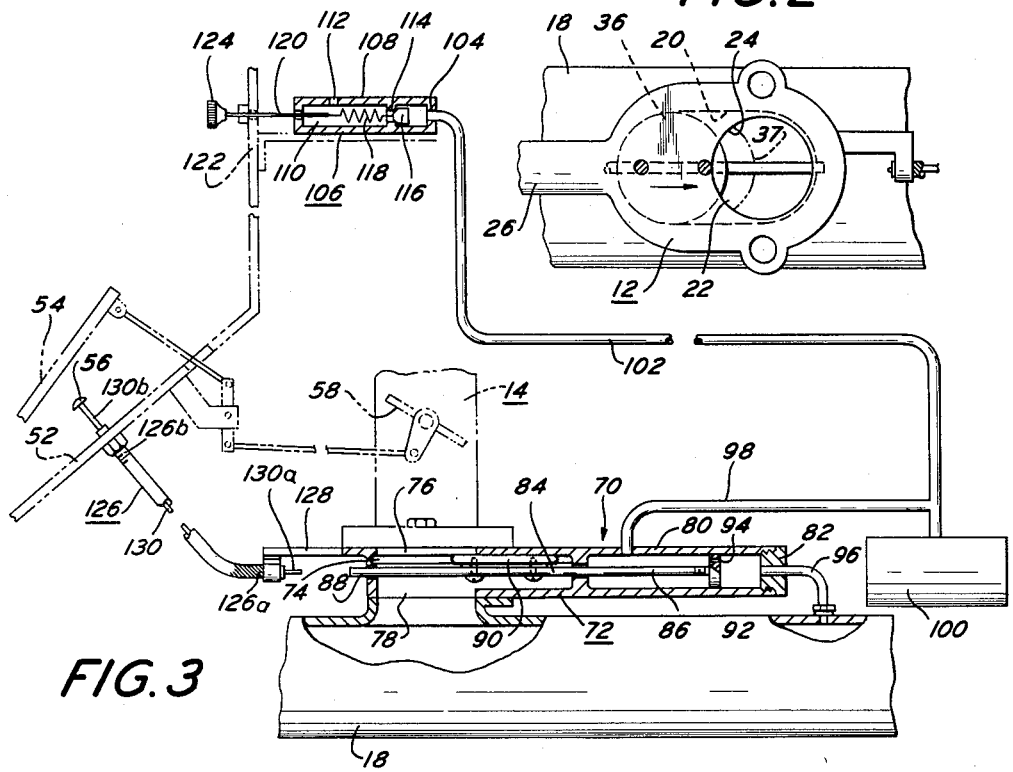
INVENTOR.
JAMES E. HARRIS
BY
ATTORNEY

United States Patent Office 3,158,141
Patented Nov. 24, 1964

3,158,141
REGULATING VALVE SYSTEM
James E. Harris, Palmyra, N.J.
(521 Summit Ave., Fort Washington, Pa.)
Filed Apr. 9, 1962, Ser. No. 186,176
9 Claims. (Cl. 123—103)

The present invention relates to a regulating valve system and more particularly to a regulating system for controlling the manifold vacuum of the internal combustion engine of an automotive vehicle.

In the operation of the internal combustion engine of an automotive vehicle, optimum fuel economy for a certain speed is achieved when the manifold vacuum of the engine is maintained at or above a certain level, corresponding to that required to maintain that speed when the vehicle is operating on a level road. A decrease in the manifold vacuum level results in an increase in the density of air-fuel mixture, and therefore, an increase in fuel consumption.

When the operator of an automotive vehicle presses down on the accelerator, the throttle of the carburetor is opened to permit a greater mass rate of flow of the fuel-air mixture to the engine. This increase in the flow of the fuel-air mixture is attained with a decrease of the vacuum in the engine manifold. Such a decrease in the manifold vacuum beyond the level needed to power the engine results in higher fuel-air mixture density and, therefore, in poor fuel economy. Poor fuel economy often occurs as a result of careless and unnecessarily heavy acceleration.

It is an object of this invention to provide a new and improved system for fuel economy in an automotive engine.

Another object is to provide a new and improved regulating valve system to maintain a substantially constant manifold vacuum in an automotive internal combustion engine.

Another object is to provide a new and improved regulating valve system for controlling the manifold vacuum of the internal combustion engine of an automotive vehicle to achieve optimum fuel economy.

Another object is to provide a new and improved regulating valve system for maintaining the manifold vacuum of the internal combustion engine of an automotive vehicle at or above a desired level.

In accordance with an embodiment of this invention, the regulating valve system comprises a valve mounted between the outlet opening of the carburetor of the engine and the inlet opening to the manifold of the engine. The valve is adapted to open and close the passage between the carburetor and the manifold to control the flow of the fuel-air mixture from the carburetor to the manifold. The valve is connected to a pressure sensitive element, one side of which is exposed directly to the vacuum in the manifold. Thereby a decrease of the manifold vacuum tends to move the valve to cover more of the passage between the carburetor and manifold, and an increase in the manifold vacuum tends to move the valve to uncover more of the passage between the carburetor and manifold. A counterbalance force means is applied to the pressure sensitive element to balance the action of the manifold vacuum. The counterbalance force means in one embodimen is a spring, and in a second, a source of vacuum. The counterbalance force means provides a reference that controls movement of the valve as the manifold vacuum varies. Thus, as long as the manifold vacuum corresponds to the reference force, the valve does not move. However, if the manifold vacuum starts to increase or decrease from the reference level, the valve moves to open or close the passage between the carburetor and manifold. Thereby, the control valve is effective to maintain the manifold vacuum at or above the predetermined level.

The foregoing and other objects of this invention, the features thereof, as well as the invention itself, may be more fully appreciated and understood from the following description when read together with the accompanying drawing in which:

FIG. 1 is a side elevational view, partially in section, of the regulating valve system of the present invention mounted on an internal combustion engine of an automotive vehicle;

FIG. 2 is a sectional view taken along line 2—2 of FIG. 1; and

FIG. 3 is a side elevational view, partially in section, of a modification of the regulating valve system of the present invention mounted on an internal combustion engine of an automotive vehicle.

In the drawing, corresponding parts are referenced by the same numerals.

In FIG. 1, the regulating valve 10 comprises a casing 12 mounted between the outlet opening of a carburetor 14 and the inlet opening 16 of the manifold 18 of an internal combustion engine for an automotive vehicle. Casing 12 is provided with a valve chamber 20 having inlet and outlet openings 22 and 24 formed in the upper and lower walls thereof. Inlet opening 22 extends across the outlet opening of the carburetor 14, and outlet opening 24 extends across the inlet opening 16 of the manifold 18. Thus, the valve chamber 20 provides a passage for the fuel-air mixture to pass from the carburetor 14 to the manifold 18. A cylinder 26 is integral with and projects from the wall at one end of the casing 12. The free end of the cylinder 26 is closed by a threaded cap 28.

A slidable rod 30 extends across the valve chamber 20 between the inlet opening 22 and outlet opening 24 of the valve chamber. One end 32 of the shaft 30 extends into the cylinder 26 and is slidably supported in an opening in the wall of the casing 12 between the cylinder and the valve chamber 20. The other end 34 of the shaft 30 extends through and is slidably supported in an opening in the wall at the opposite end of the casing 12. Suitable packing is provided in the casing walls through which the shaft slides. A valve disc 36 is secured to the shaft 30 within the valve chamber 20. Valve disc 36 is mounted parallel to the outlet opening 24 of the valve chamber 20 and is actuated by shaft 30 to slide across the outlet opening 24 to open and close that opening. The valve disc 36 does not fit tightly over the outlet opening 24 so that even when the valve disc is completely over the outlet opening, a small passage still remains around the valve disc to the outlet opening.

A piston 38 is mounted on the end 32 of the shaft 30 within the cylinder 26. A length of tubing 40 is connected between an opening in the cap 28 on the cylinder 26 and an opening in the wall of the manifold 18. Thereby, tubing 40 connects the portion of the cylinder 26 on the free face of the piston 38 to the manifold 18 so that the pressure within the manifold 18 is applied to the face of the piston 38. A spring 42 is compressed between the cap 28 and the face of the piston 38. The portion of the cylinder 26 on the shaft side of the piston 38 is connected to atmospheric pressure through an air vent hole 44 in the wall of cylinder 26.

The regulating valve 10 is provided with means for bypassing the automatic operation of the valve. This bypass means comprises a control cable, generally designated as 46, that includes a flexible sheath 48 and a thin flexible cable 50 slidable longitudinally in the sleeve 48. One end 46a of the control cable 46 is secured to a bracket 52 on the end of the casing 12 through which shaft 30 extends, with the end 50a of the cable 50 projecting from the sleeve 48 in axial alignment with the end 34 of the valve shaft 30. The other end 46b of the control cable sheath 48 is secured in an opening in the floor board 52 of the automotive vehicle with the end 50b of the cable 50 projecting as a plunger above the floorboard directly under the accelerator pedal 54. A kick-down button 56 is provided on the end 50b of the shaft 50 and is adapted to be engaged by the accelerator pedal 54 when the latter is pushed close to the floorboard 52.

The carburetor 14 is of any standard type used on the internal combustion engines of automotive vehicles. Such a carburetor ordinarily includes a butterfly throttle valve 58 connected by appropriate linkages 60, 62, and 64 to the accelerator pedal 54. Thus, when the driver of the vehicle presses down on the accelerator pedal 54, the throttle valve 58 of the carburetor 14 is pivoted to open the throttle valve, and thereby allow an increase in the flow of the fuel-air mixture to the manifold 18 of the engine.

The regulating valve 10 of the present invention operates as follows:

When the engine is running, the manifold vacuum is applied to the face of the piston 38 via the vacuum line of tubing 40, and atmospheric pressure is applied to the opposite side of the piston. Since the pressure to the right of the piston is greater than the vacuum pressure, the shaft 32 slides to the left (as viewed in FIG. 1). The shaft 30 slides the valve disc 36 to the left so as to open the outlet opening 24 and allow a greater flow of the fuel-air mixture from the carburetor 14 to the manifold 18. The force of the spring 42 opposes movement of the shaft 32 to the left. As the vacuum gets higher, the valve disc is moved to open the manifold inlet more and more until a vacuum level is reached at which the open-position of the valve (which may be the broken line position 37 shown in FIG. 2) is such that the throttle position fully controls the manifold vacuum. As the vacuum increases further, the valve disc is moved to the fully open position. Contrariwise, as the vacuum decreases, the spring moves the valve disc in a direction to close the manifold inlet, and the valve disc re-establishes control over the flow into the manifold inlet and, thereby, over the manifold vacuum.

The preset value of manifold vacuum to be maintained by the control valve system is chosen in accordance with the level of engine performance (i.e. acceleration) and the level of fuel economy desired. The higher the vacuum, the greater is the fuel economy and the lower the performance. When the manifold vacuum attains the preset value, the valve disc 36 assumes a partially closed position to permit the same mixture flow as the throttle valve 58 would normally permit for that vacuum and engine speed. If the throttle valve position is such as to produce the preset vacuum, the valve disc 36 is not in control, but rather in position 37 just on the verge of assuming control. As the operator lets up on the accelerator, the throttle valve closes, the vacuum increases, and the control valve is opened fully so that it is without any control effect. When the accelerator is depressed with the valve disc in position 37, the vacuum decreases slightly below the preset value, and valve disc 36 closes further to compensate for the throttle being open. The valve disc is then in control and effective to maintain the vacuum substantially at the preset value. Further opening of the throttle is without substantial effect since the valve disc is fully effective to maintain the preset vacuum level.

When the engine of the vehicle is not running, the pressure in the manifold 18 is that of atmospheric pressure. Thus, the pressures on both sides of piston 38 are equal, and the force of the spring 42 holds the shaft 32 in its right-hand-most position as viewed in FIG. 1 so that the valve disc 36 is completely over the outlet opening 24 of the valve chamber 20. When the engine is cranked, some of the fuel-air mixture from the carburetor 14 is drawn through the small opening around the valve disc 36 to start the engine running. Once the engine is started and idling, the vacuum in the manifold 18 increases to a value determined by the characteristics of the engine, such as its compression ratio and general mechanical condition. Generally, the idling vacuum is higher than the preset value for the control operation, and the control is ineffective.

The design of the spring 42, piston 38, and valve disc 36 are such that for a certain steady engine r.p.m. or vehicle speed, the valve disc 36 is partially open (as shown at 37 in FIG. 2) and on the verge of control to maintain the preset value. This vehicle speed may vary with the particular operation of the vehicle; for example, it may be 65 miles per hour in high gear on a level highway. Thus, the force on the piston face at 65 m.p.h. due to the manifold vacuum balances the force of the compressed spring so that the valve disc 36 is in its on-the-verge-of-control position. Consequently, the throttle position controls the manifold vacuum at that engine or vehicle speed.

However, when the driver presses down on the accelerator pedal 54 to increase the speed of the vehicle above the desired steady-state speed of 65 m.p.h., the throttle valve 58 opens further and allows a greater flow of the fuel-air mixture from the carburetor through the valve chamber 20 into the manifold 18. This increase in the flow of the fuel-air mixture reduces the vacuum in the manifold below the desired preset vacuum of 8 inches of mercury, and the valve disc 36 is moved to partially close the outlet opening 24 and re-establish control. This, in turn, reduces the flow of the fuel-air mixture to the manifold 18 so as to increase the manifold vacuum back towards the preset vacuum. Thus, the regulating valve 10 of the present invention automatically tends to maintain the vacuum in the manifold 18 at or above the desired preset level. The regulating valve tends to offset the tendency of many drivers to speed up unconsciously on high speed highways and tends to help the driver to avoid such accelerating. Thereby, the fuel consumption is regulated to be at an optimum level for the steady-state speed.

The regulating action is especially effective during acceleration as in start-stop city driving. The tendency of many drivers is to press unnecessarily heavily on the accelerator pedal to get up to higher speed rapidly. The heavy pedalling opens the throttle almost full and decreases the manifold vacuum almost to atmospheric pressure. The high pressure of the fuel-air mixture is extremely wasteful of fuel, and many drivers are not sufficiently skilled or disciplined to moderate the acceleration at an efficient level. However, the regulating valve is effective to overcome the effect of the open throttle by partially closing the manifold inlet as soon as the manifold vacuum falls below the preset value. Consequently, the acceleration of the vehicle is reasonably smooth without wasting fuel.

The regulating valve is directly controlled by the manifold pressure and, thereby, its operation is directly related to the amount of fuel-air mixture being fed to the engine. Accordingly, it is extremely effective in regulating the fuel consumption in an economic fashion.

While the regulating valve 10 of the present invention automatively tends to maintain a minimum preset manifold vacuum for greater fuel economy, the control limits the extreme power output of the engine. Although such a limit on the power output of the engine does not adversely affect normal operation of the vehicle, there are times when it is necessary to have full engine power, such as for passing or hill climbing. When full engine power is so required, the operator merely presses down on the accelerator pedal 54 sufficiently to engage the kick-down button 56 of the control cable 50. Thereby, the cable is actuated through the sleeve 48 to force the end 50a directly against the end 34 of the valve shaft 30. The spring force on shaft 30 is small and easily overcome to force the valve shaft 30 and the valve disc 36 to the left which opens the manifold inlet 24 an amount depending upon the further travel of the accelerator after the engagement of the cable end 50a with valve shaft 30. Accordingly, the regulating valve is momentarily partially or fully disabled. However, as soon as the accelerator is returned to the normal operating range, the regulating valve reestablishes control.

The spring 42 is not a constant force device since the force of the spring varies with its compression and, thereby, with the displacement of the piston or valve disc. Accordingly, the vacuum maintained in the manifold under control of the valve disc varies slightly with the position of the valve disc, when in control. Variations in valve position when in control are due to the different flow demands of the engine at different operating speeds.

If desired, the spring 42 may be changed to a tension spring connected between the other end 34 of the shaft 30 and the bracket 52. Moreover, the spring can be arranged in a suitable manner so that its force can be adjusted to vary the preset manifold vacuum level and determine the performance and fuel economy of the vehicle as may be required.

Referring to FIG. 3, a modification of the regulating valve of the present invention is generally designated as 70. Regulating valve 70 is similar to the regulating valve 10 shown in FIG. 1 and previously described but differs in the means for balancing the force on the piston applied by the vacuum in the manifold. In the regulating valve 10 of FIG. 1, the characteristics of the spring 42 used to balance the force applied on the piston by the vacuum in the manifold provides a somewhat non-linear operation of the regulating valve. However, in the regulating valve 70, a linear operation is obtained by using a second source of pressure which is maintained at a desired preset vacuum corresponding to the desired vacuum in the manifold.

Regulating valve 70 comprises a casing 72 having a valve chamber 74, an inlet opening 76, and an outlet opening 78. The casing 72 is mounted between the carburetor 14 and the manifold 18. The valve chamber 74 provides a passage for the fuel-air mixture to pass from the carburetor 14 to the manifold 18. A cylinder 80 is integral with and projects from one end of the casing 72. The free end of the cylinder 80 is closed by a cap 82.

A shaft 84 extends across the valve chamber 74 between the inlet opening 76 and outlet opening 78. One end 86 of the shaft 84 extends into the cylinder 80 and is slidably supported by the wall of the casing 72 between the cylinder and the valve chamber 74. The other end 88 of the shaft 84 extends through and is slidably supported by the end wall of the casing 72. A valve disc 90 is secured to the shaft 84 within the valve chamber 76. Valve disc 90 is parallel to the outlet opening 78 of the valve chamber 74 and is slidable across the outlet opening 78 with the shaft 84 to vary the size of the outlet opening.

A piston 92 is mounted on the end 86 of the shaft 84 within the cylinder 80. Piston 92 has a small orifice opening 94 therethrough (or clearance between it and the cylinder wall) to provide a leakage path from one side of the piston to the other side thereof. A tube 96 is connected between an opening in the cap 82 and an opening in the wall of the manifold 18 to the interior of the manifold so that the manifold vacuum is applied to the front end of the piston.

Another vacuum line is formed by tubing 98 connected between the shaft side of the piston 92 and a chamber 100 so that the pressure within the chamber is applied to the back side of the piston. The chamber 100 is connected by a pipe 102 to the outlet port 104 of a spring-loaded check valve, generally designated as 106. The chamber 100 may be any suitable container such as a bottle that is closed except for the one opening thereto.

The check valve 106 comprises a body 108 having a cylindrical passage 110 therethrough. The passage 110 extends between an inlet port 112 open to the atmosphere and the outlet port 104. A valve seat 114 is provided in the passage 110 between the inlet port 112 and the outlet port 104. A valve plug 116 is retained within the passage 110 on the side of the valve seat 114 adjacent the outlet port 104 by means of a tension spring 118 connected at one end to the valve plug 116. An adjustment rod 120 is connected to the other end of the spring 118 and projects from the other end of the valve body 108. Adjustment rod 120 extends through and is slidably supported on the dashboard 122 of the vehicle. A knob 124 is mounted on the end of the adjustment rod 120 to permit ease of sliding the adjustment rod longitudinally. Adjustment rod 120 permits varying the force applied by the spring 118 on the valve plug 116; the friction of the bearing for the rod 120 retains it in its position of adjustment to control the reference vacuum established by the check valve.

The regulating valve 70 is provided with a control cable 126 similar to the control cable 46 of the regulating valve 10 of FIG. 1 to permit bypassing the automatic operation of the regulating valve 70. One end 126a of the control cable 126 is secured to a bracket 128 on the end of the casing 72 with the end 130a of the slidable cable 130 in direct axial alignment with the end 88 of the valve shaft 84. The other end 126b of the cable 126 is secured to the floor board 52 of the automotive vehicle with the end 130b of the cable 130 projecting through and beyond the floor board directly under the accelerator pedal 54. Kickdown button 56 is secured to the end 130b of the cable 130 and is adapted to be engaged by the accelerator pedal 54 in the manner described above.

In the operation of the automotive vehicle, the regulating valve 70 functions in substantially the same manner as the regulating valve 10 of FIG. 1, previously described. When the engine is running to create a vacuum in the manifold 18, the same vacuum is applied to the face of the piston 92. This vacuum effectively passes through piston opening 94 and is established in chamber 100 which functions as a reservoir.

Since the chamber 100 is connected to the outlet port 104 of the check valve 106, the same vacuum that is created in the chamber is also created in the portion of the check valve between the valve plug 116 and the outlet port 104. The vacuum in the chamber 100 increases until the pressure differential across the valve plug 116 of the one-way valve 106 applies a force on the valve plug greater than the force applied to the valve plug by the spring 118. The valve plug 116 then moves away from the valve seat 114 to permit air to pass through the one-way valve 106 to the chamber 100, and thereby decrease the vacuum in the chamber. When the force applied to the valve plug 116 by the pressure differential thereacross reaches the same force as applied thereto by the spring 118, the valve plug returns to its position against the valve seat 114. Thus, the check valve 106 maintains a substantially constant vacuum in the chamber 100 when the engine is running and tending to increase the vacuum level. The chamber vacuum is a reference that is determined by the tension in the spring 118, which tension can be varied by means of the adjustment rod 120 and by the leakage rate past the piston 92.

The reference vacuum in the chamber 100 is applied to the back side of the piston 92 to balance the vacuum in the manifold 18 which is applied to the face of the piston. Thus, when the vacuum in the manifold 18 increases beyond the reference value, the piston 92 moves to the right (as viewed in FIG. 3) to slide the valve disc 90 to open the outlet opening 78, and the valve disc is out of control. If the vacuum in the manifold 18 decreases below the reference value, the piston 92 is moved to the left, and the valve disc 90 covers more of the outlet opening 78 to re-establish control. This decreases the flow of the fuel-air mixture to the manifold 18 to return the manifold vacuum back to the desired preset vacuum. The valve disc operation is otherwise generally similar to that described for the system of FIG. 1. Once the engine is running and the manifold vacuum establishes the reference level in chamber 100, that reference level is automatically maintained in the chamber by means of the check valve 106 and by the manifold vacuum that is regulated by the valve disc 90. As previously stated, the vacuum maintained in the chamber 100 can be regulated by the operator of the vehicle by moving the adjustment rod 120 to vary the tension of the spring 118. Thus, the operator of the vehicle can adjust the vacuum maintained in the manifold 18 to achieve optimum fuel economy for the particular driving conditions of the vehicle.

In place of the sliding control valve 36 or 90, a butterfly control valve similar to the type used for the throttle valve 58 has been used. The construction in other respects is similar to that described above; the piston rod 32 or 86 of the manifold pressure detecting device is pivotally linked to the actuating rod for such a butterfly valve (similar to the rod 69) so as to accommodate any transverse movement of the rod. Other forms of pressure sensitive devices may be used to position the control valve in accordance with a difference between the effects of the manifold vacuum and a reference.

This invention provides a regulator system for an automotive engine which employs a regulating valve to maintain a substantially constant manifold vacuum under certain operating conditions. Thereby, optimum fuel economy is achieved for these conditions in that the maximum effective power output of the engine for normal operation is limited by directly controlling the fuel density intake. That is, the operator of the vehicle is effectively prevented from feeding more than a certain amount of fuel-air mixture to the engine except when emergency conditions require full engine output. Accordingly, the waste of fuel due to careless acceleration habits common to many drivers is prevented. Moreover, the driver of the vehicle can adjust the maximum normal power output of the engine to suit different driving conditions.

The present invention may be embodied in other specific forms without departing from the spirit or essential attributes thereof, and, accordingly, reference should be made to the appended claims rather than to the foregoing specification as indicating the scope of the invention.

What is claimed is:

1. In an internal combustion engine of an automotive vehicle having a carburetor and an intake manifold, a regulator system for automatically controlling the flow of fuel-air mixture from the carburetor to the manifold, said regulator system comprising a regulating valve connected between the outlet of the carburetor and the inlet of the manifold, said valve adapted to be moved between an open position and a closed position to control the flow of the fuel-air mixture from the carburetor to the manifold, and means exposed to the vacuum in the manifold for operating said valve between its positions upon a change in the manifold vacuum, said operating means comprising a piston slidably mounted in a cylinder and connected to the valve, means connecting one portion of the cylinder to the manifold to be maintained at the manifold vacuum, and means for applying a force on said piston in a direction opposite to the force applied on the piston by the manifold vacuum, said means for applying the opposing force on the piston including a source of reference vacuum applied to the other side of the piston, and means for maintaining said vacuum source at a desired pre-set vacuum, said operating means including means providing a leakage path from one side of the piston to the other side thereof, and said vacuum source comprising a chamber connected to the portion of the cylinder on the other side of the piston so that the leakage path admits manifold vacuum to said chamber to develop said reference vacuum, and a check valve connecting said chamber to the atmosphere, said check valve permitting flow of air into said chamber when the vacuum in said chamber increases beyond the desired pre-set vacuum.

2. A regulator system in accordance with claim 1 including operator means for holding the regulating valve in its open position to override the automatic operation of the valve.

3. In an internal combustion engine of an automotive vehicle having a carburetor and an intake manifold, a regulator system for automatically controlling the flow of fuel-air mixture from the carburetor to the manifold, said regulator system comprising a casing mounted between the outlet opening of the carburetor and the inlet opening of the manifold, said casing having a valve chamber, an inlet opening between the outlet of the carburetor and the valve chamber, and an outlet opening between the chamber and the inlet of the manifold, an enclosed cylinder secured to and projecting from one end of the casing, a shaft extending across the valve chamber and projecting into the cylinder, said shaft being longitudinally reciprocable, a valve disc mounted in the valve chamber and secured to said shaft, said valve disc being slidable across the outlet opening of said casing upon reciprocation of said shaft, a piston on the end of the shaft within the cylinder, a vacuum line connecting the portion of the cylinder on one side of the piston to the manifold to expose said one side of the piston to the vacuum in the manifold, and means for applying a force on the piston in a direction opposite to the force applied to the piston by the vacuum in the manifold, said means for applying the opposing force on the piston comprising a source of vacuum applied to the portion of the cylinder on the opposite side of the piston, and means for maintaining said source of vacuum at a desired pre-set vacuum, said piston including means providing a leakage path from one side of the piston to the other side thereof, and said vacuum source comprising a chamber, a duct connecting said chamber to the portion of the cylinder on the opposite side of the piston to admit manifold vacuum to said chamber and develop said vacuum source, and a check valve connecting said chamber to the atmosphere, said check valve permitting a flow of air into said chamber when the vacuum in said chamber increases beyond the desired pre-set vacuum.

4. A regulator system in accordance with claim 3 in which the check valve comprises a valve body having a passage therethrough and a valve seat, a valve plug in said body and spring means urging said valve plug against said valve seat.

5. A regulator system in accordance with claim 4 including means for manually regulating the force of the spring of the one-way valve on the valve plug to regulate the pre-set vacuum maintained in the chamber.

6. In an internal combustion engine of an automotive vehicle having a carburetor, an accelerator linkage to said carburetor, and intake manifold, a regulator system for automatically opposing the effect of operating said accelerator linkage tending to decrease the vacuum in the manifold, said regulator system comprising a pressure sensitive device responsive to differences in pneumatic pressures for regulating the fuel-air mixture to the manifold, means for applying said manifold vacuum to said pressure sensitive device, means including a reservoir for developing a certain reference vacuum from said manifold vacuum corresponding to a steady state speed of said vehicle and for applying said reference vacuum to said pressure sensitive device for comparison with said manifold vacuum to develop said pressure differences, whereby the operation of said accelerator tending to decrease said manifold vacuum is opposed.

7. The combination recited in claim 6 wherein said reference vacuum developing means includes a check valve connected to said reservoir, and means for adjustably loading said check valve to vent said reservoir upon increases in vacuum beyond a certain level.

8. In an internal combustion engine having a carburetor, a throttle control linkage to said carburetor, and intake manifold, a regulator system for automatically opposing the effect of operating said throttle control linkage tending to decrease the vacuum in the manifold, said regulator system comprising a pressure sensitive device responsive to differences in pneumatic pressures for regulating the fuel-air mixture to the manifold, means for applying said manifold vacuum to said pressure sensitive device, means including a chamber for developing a certain reference vacuum from said manifold vacuum corresponding to a steady state operating condition of the engine and for applying said reference vacuum to said pressure sensitive device for comparison with said manifold vacuum to develop said pressure differences, whereby the operation of said throttle linkage tending to decrease said manifold vacuum is opposed.

9. The combination recited in claim 8 wherein said means for developing a reference vacuum further includes a leakage path across said pressure sensitive device to said manifold applying means to admit manifold vaccum to said chamber to develop said reference vacuum and means for varying the level of the vacuum developed from said leakage path to vary the reference vacuum.

References Cited in the file of this patent

UNITED STATES PATENTS

| | | |
|---|---|---|
| 742,290 | Clark | Oct. 27, 1903 |
| 2,248,780 | Pierce | July 8, 1941 |
| 2,354,778 | Simpson | Aug. 1, 1944 |
| 2,962,015 | Serruys et al. | Nov. 29, 1960 |
| 3,027,884 | Bale et al. | Apr. 3, 1962 |